June 26, 1962  C. G. MATTSON  3,040,818
APPARATUS FOR THINNING IN PLANT ROWS
Filed Sept. 11, 1958  3 Sheets-Sheet 1

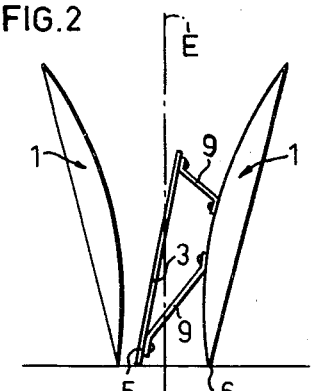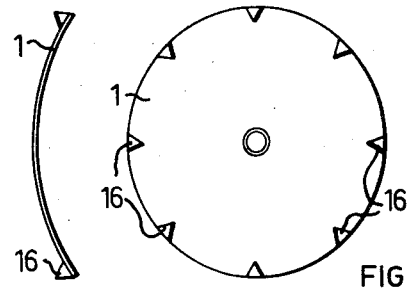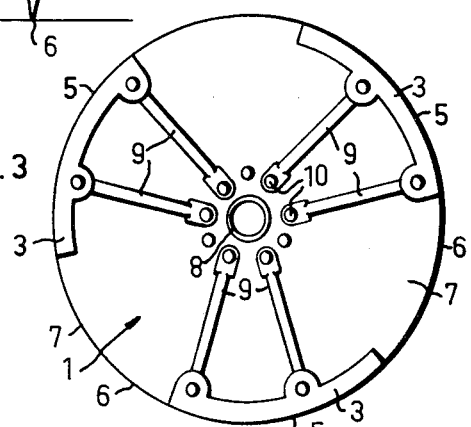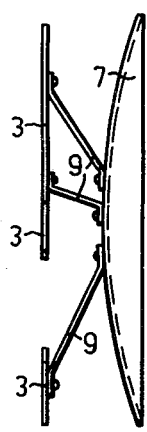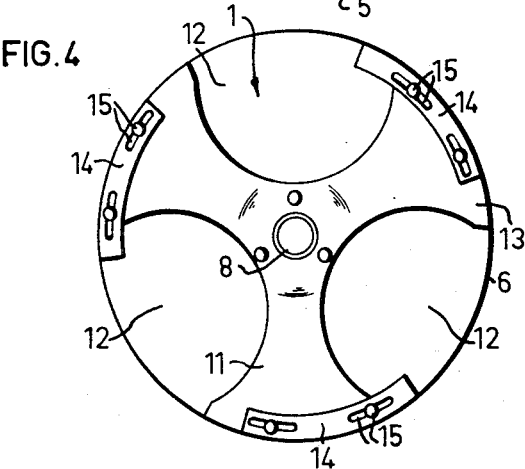

June 26, 1962  C. G. MATTSON  3,040,818
APPARATUS FOR THINNING IN PLANT ROWS
Filed Sept. 11, 1958   3 Sheets-Sheet 3

United States Patent Office 3,040,818
Patented June 26, 1962

3,040,818
APPARATUS FOR THINNING IN PLANT ROWS
Claes Gunnar Mattson, Herrestorp, Vellinge, Sweden
Filed Sept. 11, 1958, Ser. No. 760,418
Claims priority, application Sweden Sept. 16, 1957
7 Claims. (Cl. 172—555)

This invention relates to an apparatus for thinning plant rows, which is rotatable and adapted for propulsion longitudinally of the rows and has peripherally spaced apart cutting members for intermittent engagement with the soil surface.

Apparatus of this type have already been suggested. These apparatus permit hoeing of the soil surface between the rows in e.g., a field of sugar-beets for weeding and loosening of the soil, simultaneously as they effect a thinning of the sugar-beets. The apparatus for such thinning in connection with the hoeing usually are in the form of attachments that are mounted on hoeing implements. These attachments, however, are relatively complicated and expensive and have therefore been used only to an insignificant extent. Farmers prefer to procure separate implements for thinning and hoeing.

The invention particularly but not exclusively is intended for use with hoeing implements having protecting disks which, when hoeing is effected between the plant rows, roll on the soil on either side of the row and have their axes inclined to said row, as seen from above.

The invention provides a simple and inexpensive apparatus for thinning in connection with hoeing and in a preferred form is characterized by a pair of rotary choppers, each comprising a plurality of circumferentially spaced cutters which are mounted close together on opposite sides of a vertical longitudinal or central plane along which the apparatus moves, which plane may be centered on a row of plants to be thinned. The planes in which the cutters of the respective choppers move are inclined with respect to said central plane as seen from above. The axes of rotation of the choppers intersect at this plane. The choppers are connected together for synchronous rotation and their cutters are intermeshed without touching each other, so that the paths of both sets of cutters cross through the central plane of the apparatus. Thus, each cutter moves in a portion of its path on one side of this plane, and in the other portion of its path on the opposite side thereof. During the lower portion of its path, each cutter moves through the earth from one side of the central plane to the other, one set of cutters moving from left to right and the other, in alternating sequence, from left to right. Each cutting member by its engagement with the soil surface in the row proper not only causes the apparatus to rotate and moves the next cutting member into engagement with the soil surface, but also during its movement in the row removes part of the plants in said row. The rotary choppers, in another preferred form of the invention, may be fixed to the facing sides of a pair of plant protecting disks advanced on opposite sides of a plant row. Also, in accordance with the invention, a rotary chopper may be fixed to only one of such a pair of disks.

Further features of the invention and the advantages gained thereby will become apparent from the following description, reference being had to the accompanying drawings which illustrate some embodiments by way of example. In the drawings:

FIG. 2 is a diagrammatic plan view of a first embodiment of the invention.

FIGS. 3 and 4 are side elevations of a second and third embodiment.

FIGS. 5 and 6 are a vertical section and side elevation, respectively, of a protecting disk.

Hoeing implements with which the invention is particularly suited for use consist, whether they are adapted for towing by draft animals or tractors, of a wheeled frame A including a knife-carrying bar B which presents a number of vertically movable arms C for knives D, and protecting disks 1 which are advanced in engagement with the soil as protecting means for the plants in the respective row (shown by dash and dot lines E in FIG. 1) on either side thereof and in immediate proximity thereto. Said protecting disks are somewhat convex and serve to prevent the knives D, which are advanced in the space between the rows E in engagement with the soil, from covering the plants with earth. As will appear from the drawings, the protecting disks 1 are set in a somewhat oblique position to the direction of propulsion of the implement (indicated by the arrow 2 in FIGS. 1 and 2) and are caused to rotate by their engagement with the soil.

Figure 1:
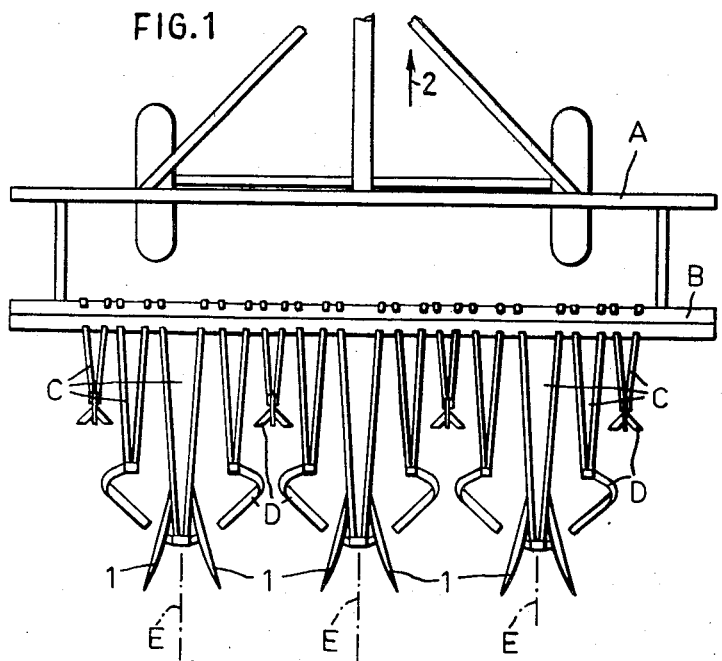
FIG. 1 is a plan view of a hoeing implement to which the invention is to be applied.

The apparatus according to the invention comprises cutting members 3, such as those shown in FIG. 3, which are arranged at least on one of a pair of protecting disks 1 of FIG. 1 advanced on either side of one of the rows E. The cutting members 3 are located on, but spaced from, the convex side of the protecting disk 1 facing the row E and have their active edges 5 approximately at a level and substantially in parallel with the peripheral edge 6 of the disk 1. The cutting members 3 are suitably spaced apart peripherally so that interstices 7 are formed between the cutting members 3 for a purpose to be elucidated in the following.

In the embodiment shown in FIG. 3, the cutting members 3 are formed by separate curved flat bars secured to the disk 1 by means of arms 9 which extend approximately radially to the axis of rotation of the disk 1 and are fixed near the hub 8 of the disk 1 by screws 10. Any suitable fixing means may, however, be used to connect the cutting members 3 with the disk 1. It will thus be seen that the cutting members 3 with their supports 9 constitute a rotary chopper, and that these with disk 1 make a combined chopping and shielding member.

In the embodiment shown in FIG. 4 the apparatus consists of a disk 11 in which recesses 12 have been made to provide spaced-apart marginal portions 13 which constitute the cutting members 3. The disk 11 is connected with the protecting disk 1 in a suitable manner. In this embodiment the cutting members 3 provided by the marginal portions 13 can be prolonged by curved flat bars 14 which are longitudinally movably mounted and thus peripherally adjustable on said portions 13. The bars 14 are preferably secured to the disk 11 by screw and slot connections 15 or in any other suitable manner.

To ensure that the disk 1 and consequently the cutting members 3 are caused to rotate by the disk 1 engaging the soil, said disk 1 at its periphery preferably has substantially laterally extending projection 16 which have been provided for example by moulding the edge of the disk 1.

FIGURE 2 is a diagrammatic plan view of a pair of disks of FIG. 1, showing the relationship of a single long cutting member 3 to the assembly. The member 3 in this figure is rigidly attached to the right hand disk 1 as viewed in the figure. Preferably, a plurality of such cutting members are attached to the same disk, as illustrated for example in FIG. 3. As will appear from FIG. 2, the cutting members 3 are mounted at such a distance from the disk 1 that, at the leading edge of the disk 1, as seen in the direction of propulsion 2, they almost reach the opposite disk 1 on the other side of the row E. Since the disk 1 is set in an oblique position and is caused to rotate by its engagement with the soil, thus carrying along the cutting members 3 which substantially extend in parallel relation with the periphery of the disk, said cutting members will move, while simultaneously advancing and turning about the axis of rotation of the disk 1, transversely through the row E and thus remove, by their engagement with the soil, a number of plants in said row E which corresponds to the peripheral extension of each cutting member. However, due to the peripheral interstices 7 existing between the cutting members 3 groups of plants will be left standing untouched in the row. By making said interstices 7 larger or smaller, e.g. by the provision and shifting of the bars 14, it is possible to vary the size of the plant groups remaining untouched in the row.

The cutting members 3 can also be arranged alternately on the two protecting disks 1 rolling on either side of the respective row, the movements of the disks 1 being coordinated in such a way that the cutting members 3 will leave plant groups standing untouched in the row at equally spaced mutual distances. It is also possible, if desired, to dispense with the protecting disk 1 and to mount the apparatus constituted by the cutting members 3 and their supports 9 and 11, respectively, on hubs of their own, with their own axes of rotation.

When the cutting members are used with a hoeing implement having protecting disks which on hoeing between the plant rows roll on the soil on either side of each row and have their axes inclined to said row, as seen from above, it is possible, for improving the apparatus, to provide for an increased freedom of selecting the inclination of the axes of the protecting disks to the plant row and permit hoeing close to said row without danger of earth being accumulated over the plants left untouched in the row, or of earth being removed from the row, which is quite as harmful. These improvements are applicable on one hand when, as explained above, the cutting members are mounted on arms which in turn are mounted on the protecting disks, and on the other when, as also explained, the cutting members are mounted on arms or spokes carried by hubs of their own.

Figure 7:
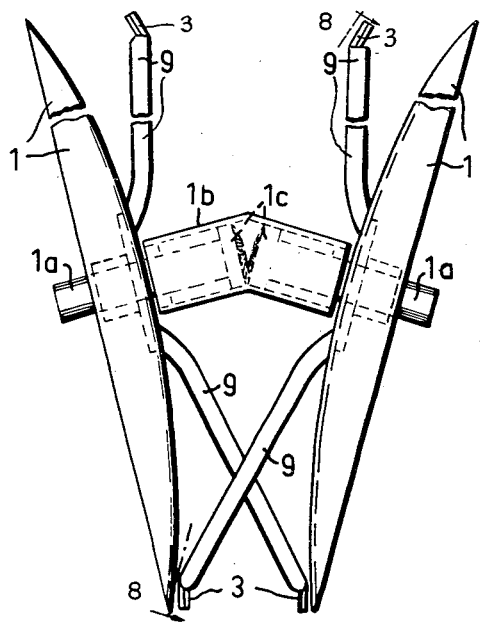
FIG. 7 is a plan view of a fourth embodiment.
Figure 8:
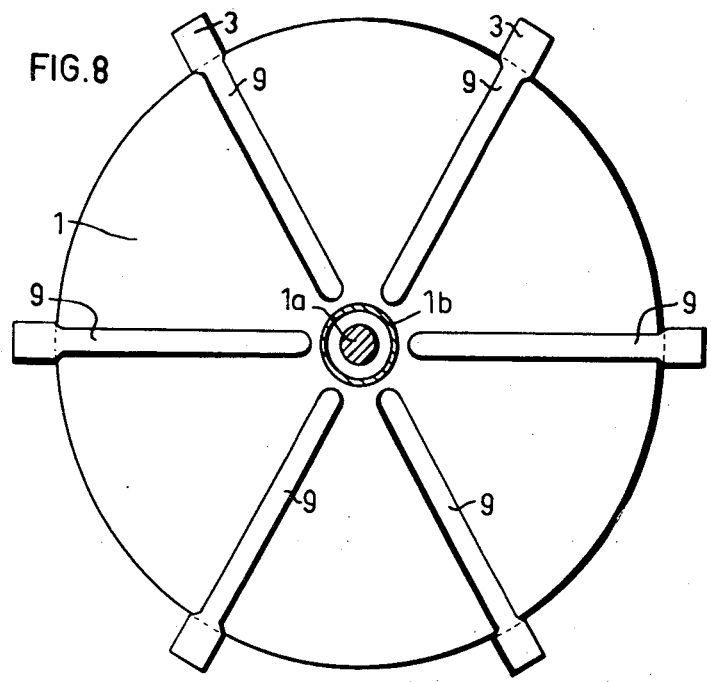
FIG. 8 is a section on line 8—8 in FIG. 7.

In FIGS. 7-9, 1 designates the two protecting disks which roll on the soil on either side of the row of plants E, and 3 the cutting members which in FIGS. 7 and 8 are mounted on the arms 9 secured to the protecting disks 1. This provides a rotary chopper mounted on a protecting disk. As will appear from FIG. 8, the cutting members 3 are of a peripheral extension which is only a fraction of what corresponds to the desired distance between the groups of plants remaining in the row after the thinning operation when a single chopper is used. However, the cutting members are so many and so distributed on the two protecting disks 1 in an invariable mutual angular position about the respective axes 1a of said disks that the removal of the plants in the row for each distance between the remaining groups of plants takes place partly by the action of cutting members on one and partly by the action of cutting members on the other of said two protecting disks 1. This arrangement brings the advantage that the earth which the protecting disks, in dependence on the inclination of their axes to the plant row, have moved away from the plant row at both sides, or the earth which the working means of the hoeing implement have accumulated adjacent the plant row, will be spread by the cutting members 3 crossing the plant row from one side to the other and thus be equalized. The necessary invariable mutual angular position of the cutting members 3 on the two protecting disks 1 about the respective axes 1a thereof is ensured, in the embodiment shown in FIGS. 7 and 8, in that said axes, which are mounted in a common support 1b, have their adjoining ends coupled together in the direction of rotation. For this purpose, the adjoining ends of said axes 1a are provided with meshing gears 1c having radiating arranged teeth on their facing end surfaces.

Figure 9:
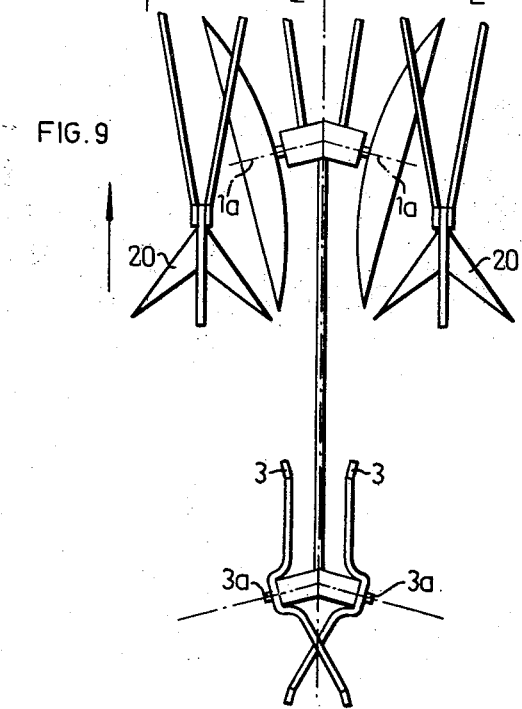
FIG. 9 is a diagrammatic plan view showing by way of example the relative arrangement of protecting disks and cutting members, when said cutting members are mounted on arms or spokes radiating from axes of their own.

In the embodiment shown in FIG. 9 the cutting members 3 are but diagrammatically indicated, only two being indicated, but each represents a plurality of cutting members. They are arranged in the same way as in FIGS. 7 and 8, with the difference, however, that the arms carrying them radiate like spokes from axes 3a of their own and are mounted on these axes in a support or hub of their own, which is secured some distance rearwardly (as illustrated in FIG. 9) or forwardly of the protecting disks 1 to the same arm of the hoeing implement to which the support of the protecting disks is secured. In FIG. 9 the working means of the hoe travelling on either side of the plant row 4 are indicated and designated 20. As in the embodiment according to FIGS. 7 and 8, the plural cutting members 3 of both choppers which, as seen from above in FIG. 9 make an angle with each other, must roll together along the soil in meshed relationship. The coupling required may be of the same design as that shown for the axes 1a in FIG. 7. A levelling of the earth in the plant row, which is favorable to the hoeing work and to the plants which the cutting members have left standing untouched in the row, can also be obtained by the action of the cutting members provided in accordance with the invention when these are fixed forwardly of the protecting disks on the arm of the hoeing implement, which carries said disks.

To improve their action, the cutting members 3 can be set in an oblique position relative to the protecting disk on which they are mounted.

What I claim and desire to secure by Letters Patent is:

1. An apparatus for thinning plants comprising a pair of generally vertcially disposed rotary choppers, said choppers being oppositely disposed one on each side of a vertical longitudinal plane containing a row of plants to be thinned, each of said choppers comprising a plurality of circumferentially spaced cutters mounted for rotation about the rotary axis of said chopper with clear spaces between said cutters, means connecting said choppers for synchronous rotation as said apparatus advances along said row, the path of rotation of the cutters about each chopper axis being in a generally vertical plane which is inclined with respect to and intersects said longitudinal plane, and each of said choppers being circumferentially offset with respect to each other, whereby upon rotation of the choppers the cutters of one chopper will pass between the open spaces between the cutters of the other chopper.

2. Apparatus as defined by claim 1, at least one of said rotary choppers comprising a protecting disk disposed outwardly of its cutters, said disk being rigidly connected to the cutters for rotation therewith.

3. Apparatus as defined by claim 2, said disk having ground-engaging means on its periphery for rotating said rotary choppers as said disk rolls over the ground.

4. Apparatus for thinning plants comprising a pair of combined chopping and shielding members disposed with their major portions respectively on opposite sides of and each extending across a vertical longitudinal plane along which said apparatus may be moved in alignment with a row of plants to be thinned, each said member comprising a disk mounted for rotation about an axis which inclines outwardly and rearwardly from said longitudinal plane on its respective side thereof, a plurality of extensions mounted on the inner side of said disk extending from adjacent the central portion of said disk radially outwardly and away from said disk on the side thereof toward said longitudinal plane, and a cutter on the outer end of each said extension, said cutters being circumferentially spaced for rotation about said axis as a center, the cutters when in the rearmost portion of their rotation being on the opposite side of said longitudinal plane from said disk, and when in the foremost portion of their rotation being on the same side of said longitudinal plane as said disk, said members being geared to each other for rotation together, the extensions and cutters of one member being circumferentially displaced with respect to those of the other so as not to interfere with each other; whereby as said apparatus advances along a row of plants, cutters from opposite sides will move through said row removing plants at spaced intervals.

5. Apparatus as defined by claim 4, each said disk being cup-shaped, with its convex side inwardly disposed toward said longitudinal plane.

6. Apparatus as defined by claim 4, each said disk having ground-engaging means on its periphery for rotating said members as said disk rolls over the ground.

7. An apparatus for thinning plants comprising a pair of generally vertically disposed rotary disks, said disks being oppositely disposed one on each side of a vertical longitudinal plane containing a row of plants to be thinned, a chopper fixed to and rotating with one of said disks on the side thereof facing the other disk, said chopper comprising a ground engaging cutter spaced from said one of said disks towards said other disk, each of said disks being in a generally vertical plane which is inclined with respect to and intersects said longitudinal plane, whereby the path of rotation of said cutter intersects said longitudinal plane so as to pass through said row from one side to the other side thereof as said apparatus moves along said row.

References Cited in the file of this patent
UNITED STATES PATENTS

| | | |
|---|---|---|
| Re. 9,031 | Johnson | Jan. 6, 1880 |
| 770,351 | Carter | Sept. 20, 1904 |
| 1,028,402 | Thornton | June 4, 1912 |
| 1,592,825 | Gardner et al. | July 20, 1926 |
| 1,663,065 | Verjrosta | Mar. 20, 1928 |
| 2,510,458 | Blackwelder et al. | June 6, 1950 |
| 2,578,365 | Mayberry et al. | Dec. 11, 1951 |
| 2,596,574 | Lutes | May 13, 1952 |